UNITED STATES PATENT OFFICE.

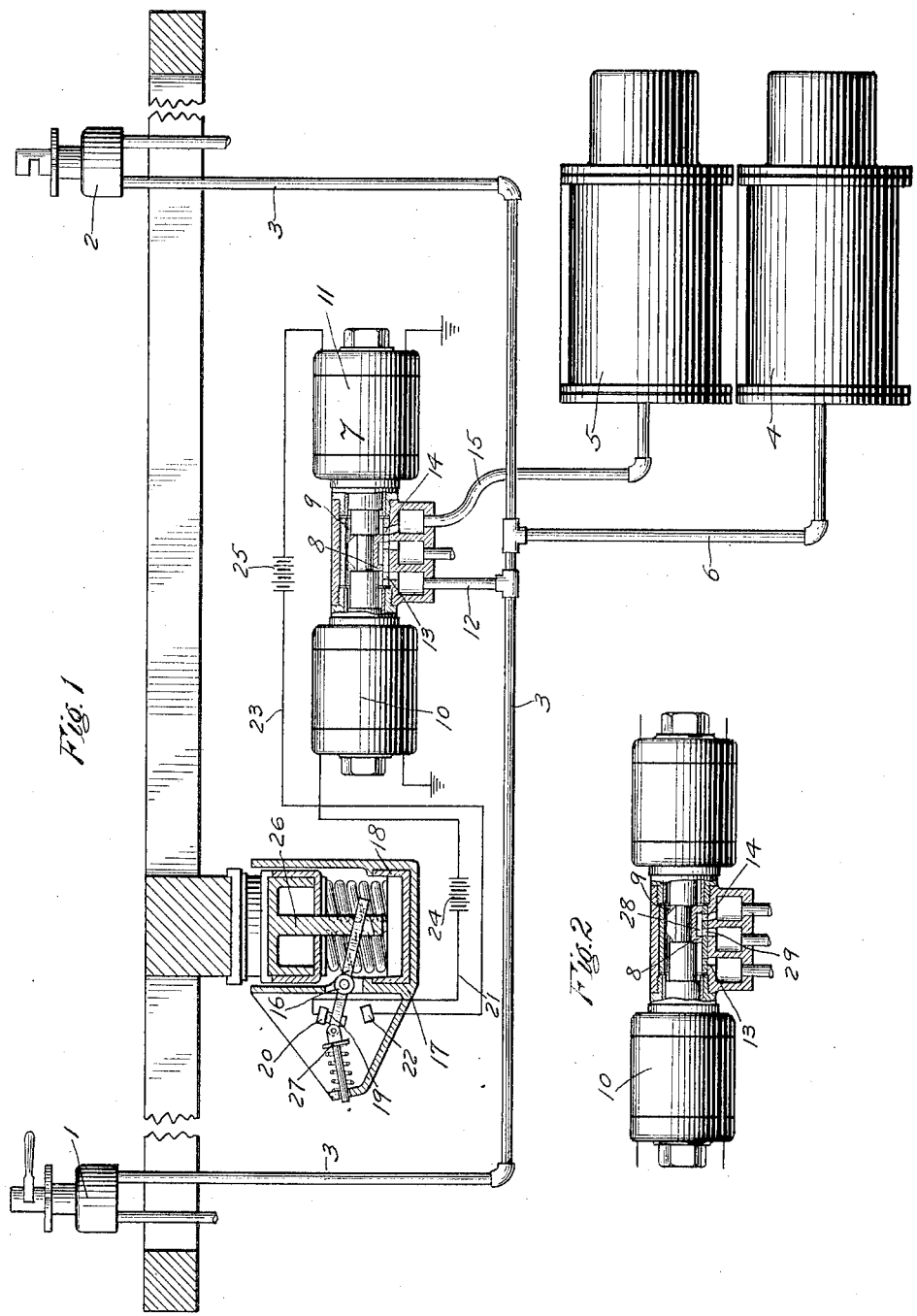

EDWARD H. DEWSON, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA.

LOAD-BRAKE.

1,089,401.  Specification of Letters Patent. Patented Mar. 10, 1914.

Application filed May 28, 1913. Serial No. 770,295.

*To all whom it may concern:*

Be it known that I, EDWARD H. DEWSON, a citizen of the United States, residing at New York, in the county of New York and State of New York, have invented new and useful Improvements in Load-Brakes, of which the following is a specification.

This invention relates to fluid pressure brakes, and more particularly to a brake equipment adapted to provide a higher degree of braking power when the car is loaded than when the car is light.

The principal object of my invention is to provide electrically controlled means governed according to the load on the car for regulating the braking power.

In the accompanying drawing; Figure 1 is a diagrammatic view of a car air brake equipment showing my improvement applied thereto; and Fig. 2 an elevational view, partly in section, of the electrically controlled load brake device in the light braking position.

My invention is more particularly designed for traction service and is illustrated as applied in connection with a straight air brake equipment suitable for single car operation.

As shown in Fig. 1 of the drawing, the car equipment may comprise straight air brake valves 1 and 2 located at opposite ends of the car and adapted to supply fluid under pressure to and release the same from a straight air pipe 3. According to my invention, two brake cylinders 4 and 5 are employed, the brake cylinder 4 being the light brake cylinder and having a pipe 6 connecting the same directly to the straight air pipe 3. The brake cylinder 5 is an additional brake cylinder which is adapted to be automatically cut in with the brake cylinder 4 when the car is loaded.

An electrically controlled device 7 is provided for controlling communication to the load brake cylinder 5 and preferably comprises a slide valve 8 contained in valve chamber 9 and electro-magnets 10 and 11 for operating said valve. A pipe 12 leading from the straight air pipe 3 is in constant communication through a port 13 in the seat of slide valve 8 with valve chamber 9 and a port 14 controlled by said valve communicates with pipe 15 leading to the load brake cylinder 5.

The respective electric circuits of the electro-magnets 10 and 11 are preferably controlled by a switch device, the operation of which is governed according to the load on the car. For this purpose I provide a switch arm 16 pivotally mounted on a casting 17 secured to the spring plank 18 of the truck and having at one end a contact 19 adapted in one position to engage a stationary contact 20 connected to circuit wire 21 of magnet 10 and in another position to engage contact 22 connected to circuit wire 23 of magnet 11. The circuit wire 21 includes a source of current 24 and wire 23 has a source of current 25 and when the switch arm makes contact with one of the stationary contacts, the corresponding magnet is energized by completing the ground connection.

The switch arm is operated by the movement of the car body and as shown the end of the switch arm opposite to the contact end is inserted in an opening of a depending member 26 which may be connected to move with the car bolster, a certain amount of lost motion being permitted in said opening, so that ordinary slight movements of the car body on its springs will be ineffective to operate the switch arm.

A quick make and break device may be applied to the switch arm, such as a spring pressed member 27 pivotally connected to the contact end of the switch arm and tending to throw the switch arm in one direction or the other as the same crosses the neutral axis of the spring device.

When the car is loaded, the car springs are compressed and the switch lever 16 is moved to the load position, as shown in Fig. 1 of the drawing, in which the circuit of magnet 10 is closed through contact 20. The energization of magnet 10 thereupon moves the valve 8 to the position uncovering port 14, so that when the brakes are applied by supplying fluid to the straight air pipe 3 through the usual operation of the straight air brake valve, fluid is also supplied from the valve chamber 9 through port 14 and pipe 15 to the load brake cylinder 5 as well as directly to the brake cylinder 4 through pipe 6. When the car is light, the switch pipe 16 is thrown to its other position by the upward movement of the car body on its springs and the circuit of magnet 11 is closed through contact 22 and circuit wire 23, while the circuit of magnet 10 is opened. The energization of magnet 11 causes the movement of the slide valve 8 to the position shown in Fig. 2, in which a cavity 28 therein connects the port 14 with an atmospheric exhaust port 29. The load brake cylinder is thus open to the atmosphere when the car is light and when applications of the brakes are made, fluid is only supplied through the straight air pipe to the light brake cylinder 4.

It will now be evident that I have provided a simple and compact construction whereby the braking power is automatically increased in making applications of the brakes when the car is loaded, and without any attention on the part of the operator.

Having now described my invention, what I claim as new and desire to secure by Letters Patent, is:

1. The combination with a fluid pressure operated brake apparatus adapted to be adjusted to give light braking power on light cars and heavy braking power on loaded cars, of electrically controlled means governed by the load on the car for controlling the adjustment of said brake apparatus.

2. In a fluid pressure brake, the combination with a brake cylinder for providing braking power on a light car and a brake cylinder adapted to be cut in to provide increased braking power on a loaded car, of electrically controlled means governed by the load on the car for cutting in said load brake cylinder.

3. The combination with a fluid pressure operated brake apparatus adapted to be adjusted to give light braking power on light cars and heavy braking power on loaded cars, of electrically operated means for controlling the adjustment of said brake apparatus and an electric switch operated according to the load on the car for controlling the circuit of said electrically controlled means.

4. In a fluid pressure brake, the combination with a brake cylinder for providing braking power on light cars and a brake cylinder for providing increased braking power on loaded cars, of a valve for connecting up said load brake cylinder to receive fluid under pressure in applying the brakes and an electro-magnet having the electric circuit thereof controlled according to the load on the car for operating said valve.

5. In a fluid pressure brake, the combination with a brake cylinder for providing braking power on light cars and a brake cylinder for providing increased braking power on loaded cars, of a valve for connecting up said load brake cylinder to receive fluid under pressure in applying the brakes, an electro-magnet for operating said valve to connect up said load brake cylinder, an electro-magnet for operating said valve to cut out said load brake cylinder, and a switch operated by the movement of the car according to the load thereon for controlling the electric circuits of said magnets.

6. The combination with a straight air brake comprising a brake cylinder and a brake valve for supplying fluid under pressure to the brake cylinder to effect an application of the brakes, of a second brake cylinder and an electrically controlled valve governed according to the load on the car for connecting up said second brake cylinder to receive fluid under pressure upon operation of the brake valve.

In testimony whereof I have hereunto set my hand.

EDWARD H. DEWSON.

Witnesses:
ALEXANDER BEGG,
E. W. DAVIS.